No. 838,440. PATENTED DEC. 11, 1906.
J. L. NEFF.
MANICURING DEVICE.
APPLICATION FILED JUNE 6, 1904. RENEWED MAR. 24, 1906.

WITNESSES:
F. B. Larson
Grace E. Gatewood

INVENTOR:
Jacob L. Neff
BY
Attorney

UNITED STATES PATENT OFFICE.

JACOB L. NEFF, OF OMAHA, NEBRASKA.

MANICURING DEVICE.

No. 838,440.  Specification of Letters Patent.  Patented Dec. 11, 1906.

Application filed June 6, 1904. Renewed March 24, 1906. Serial No. 307,923.

*To all whom it may concern:*

Be it known that I, JACOB L. NEFF, a citizen of the United States, and a resident of Omaha, in the county of Douglas and State of Nebraska, have invented a new and useful Improvement in Manicuring Devices, of which the following is a specification.

This invention relates to a new and useful improvement in a manicuring device and comprises a nail trimmer, scraper, and cleaner.

Figure 1:
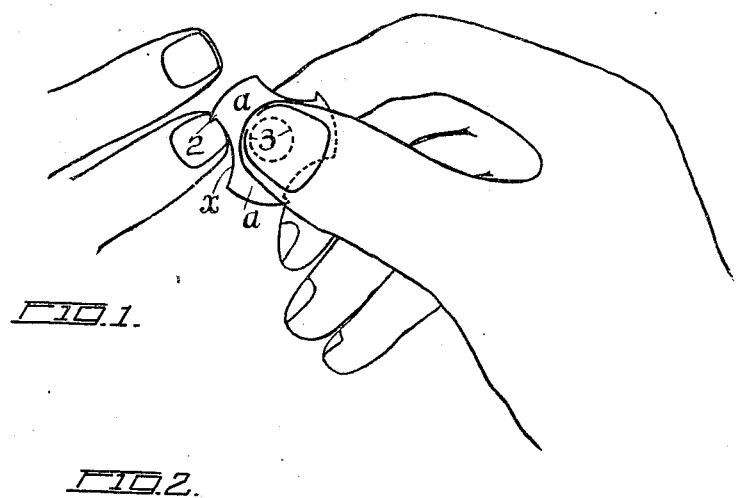
Figure 2:
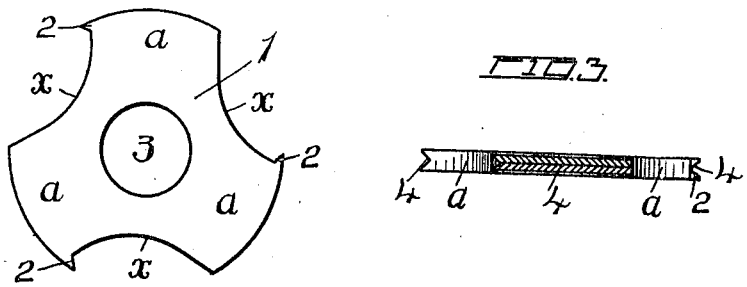
Figure 3:

In the accompanying drawings I have shown in Figure 1 a view disclosing the manner in which the tool is used. Fig. 2 shows a face view of my manicuring-tool. Fig. 3 discloses an edge view thereof.

The aim and object of my invention is to provide a simple manicuring device adapted to be carried in the pocket and by means of which the finger-nails may be readily trimmed and cleaned, the device being further adapted to be used in scraping the finger-nails and also to be used in trimming corns.

In carrying out the aim of my invention I provide a disk 1, having a central perforation 3 and being cut away, as is shown at $x$, so that I provide the three disk portions $a$, which have their peripheral edges grooved, as is shown in Fig. 3, by means of a V-shaped or concaved groove provided with the file-surface 4, so that the finger-nails may be filed and rounded by means of this file-groove 4, each disk section being provided with such a groove. The edge marked $x$ is used in scraping the nail. One edge of each file-section $a$ is provided with a projecting knife 2, which are also slotted, as is shown in Fig. 3, so that these simple knives are used in cutting the ends of the nails, as is disclosed in Fig. 1, in the manner that a draw-knife is used. These simple knives not only cut or trim the nail, but round the edge of the finger-nail and also cleans in under the finger-nail at the same time.

In trimming corns the instrument is placed over the corn and then pressed down, so that the corn will project through the central opening 3, to prevent the corn from being cut too deep, acting as a shield.

This manicuring instrument is made of various sizes, but is preferably the size of an ordinary coin, and is also preferably made of steel.

Having thus described my said invention, what I claim as new, and desire to secure by United States Letters Patent, is—

A manicuring device comprising a disk having a central perforation, and having portions of its peripheral edge cut away, the circular edge portions of the device being provided with V-shaped file-grooves, the remaining edges being sharp to serve as scraping edges, and projecting grooved knives formed in prolonging the grooved edge of the device, as set forth.

In testimony whereof I affix my signature in presence of two witnesses.

JACOB L. NEFF.

Witnesses:
 CHAS. H. VON MANSFELDE,
 GEO. W. SUES.